3,073,797
PROCESS OF REACTING POLYETHYLENE-BUTYL RUBBER BLEND WITH DICUMYL PEROXIDE AND N-METHYL-N-NITROSO-4-NITROSOANILINE
Wilbur F. Fischer, Cranford, and David R. Hammel, Colonia, N.J., assignors to Esso Research and Engineering Company, a corporation of Delaware
No Drawing. Filed Dec. 16, 1957, Ser. No. 702,831
4 Claims. (Cl. 260—45.5)

This invention relates to blends of elastomeric and plastomeric polymers. More particularly, it relates to a process for preparing modified blends of elastomeric and alkene plastomeric polymers and to the modified blends prepared in accordance with this process.

Alkene plastomeric polymers are well known to the art. Particularly useful polymers are polyethylene and polypropylene. The excellent properties of this polymer class have led to their extensive commercial use. Recently it was found that improvements in the properties of alkene plastomeric polymers prepared by the low pressure process were obtained by blending them with an elastomeric polymer such as butyl rubber. These blends showed remarkable resistance to environmental stress cracking.

It has now been found that improved blends of elastomeric and alkene plastomeric polymers can be prepared by forming the blend with small quantities of bifunctional aromatic compounds and a small quantity of a free radical type catalyst.

The alkene plastomeric polymers suitable for forming the modified blends of the present invention can be prepared by any known polymerization process, such as the so-called "high pressure" process or the low pressure process which uses a catalyst made up of reducible heavy transition metal compounds and reducing metal compounds; see for example "Petroleum Refiner," December 1956, pages 191–196. An alkene plastomeric polymer particularly useful for forming the modified blends of the invention is solid polyethylene having a molecular weight in the range of 12,000 to 500,000 or more. Other alkene plastomeric polymers such as polypropylene, polybutene, and the like can also be employed.

The elastomeric polymers suitable for use as a component of the blends are well known to the art. Butyl rubber is an elastomeric polymer which is particularly prefered for the purposes of this invention. By definition, butyl rubber is understood to refer to a copolymer of about 90 to 99.5% of isobutylene and about 10 to 0.5% of a conjugated diolefin such as isoprene, butadiene-1,4, and 2,3-dimethylbutadiene-1,4. Other elastomeric polymers can be employed to form the modified blends of the present invention, as for example halogenated butyl rubber.

The bifunctional aromatic compounds useful herein are aromatic compounds having two nitrogen-containing groups such as N-methyl-N-nitroso-4-nitrosoaniline, p-quinone dioxime, p-dinitrosobenzene, dibenzoyl-p-quinone dioxime, and the like. It is believed that the bifunctional aromatic compounds react with the polymers forming the blends by cross-linking the polymer chains under the influence of free radical type catalysts to form the improved polymer blends of the invention.

The reaction forming the modified blends of the invention is catalyzed by free radical type catalysts which by definition are those catalyst capable of initiating a chemical reaction in a reaction mixture by disassociating into at least one free radical which then reacts with one or more of the reactants present in the mixture. Particularly preferred catalysts for use herein are the peroxide catalysts, such as dicumyl peroxide, and the triazine catalyst, such as methyl phenyl triazine.

In general, the modified blends of the invention are formed by first mixing together in an internal mixer such as a rubber mill or a Banbury mixer, 100 parts by weight of an alkene plastomeric polymer, 5 to 70 parts by weight, preferably 5 to 50 parts by weight of an elastomeric polymer, 0.1 to 2 parts by weight, preferably 0.3 to 0.7 part by weight of a free radical type catalyst, and 0.1 to 4 parts by weight, preferably 0.5 to 1 part by weight of a bifunctional aromatic compound. The above mixture is then maintained with mixing at a temperature between the melting point of the alkene plastomeric polymer and about 400° F., preferably 240° to 320° F. and more preferably 275° to 290° F. for a time adapted to produce the modified blend. The time of heating in general will range from 2 to 30 minutes, preferably 6 to 20 minutes, and more preferably 8 to 12 minutes, depending on the temperature range used.

The order of addition of the reactants and the rate of mixing during the preparation of the blends are not critical, except that the polymers should not be left in contact with the free radical type catalyst for extended periods at reaction temperatures, since extensive degradation of the polymers may occur. Additionaly, it is prefered that the catalyst and the bifunctional aromatic compound be added together. For example, the process for forming the modified blends can also be carried out by first mixing together in an internal mixer the required amounts of elastomeric and alkene plastomeric polymers and thereafter adding together the required amounts of the free radical type catalyst and the bifunctional aromatic compound to the polymer mixture and then heating as above.

This invention and its advantages will be better understood by reference to the following examples.

EXAMPLE I 100 grams of polyethylene having a molecular weight of about 50,000 prepared by the low pressure process and known to the art as "Hi-Fax" was added to a Banbury mixer at a temperature of about 275° to 280° F. Then 50 grams of butyl rubber having 1.5 to 2 mol percent unsaturation and prepared from about 97.6 wt. percent isobutylene and 2.4 wt. percent isoprene was added to the polyethylene in the mixer followed by the addition together of 0.5 gram of N-methyl-N-nitroso-4-nitrosoaniline and 0.5 gram of dicumyl peroxide. The temperature was then raised to 300–320° F. and the mixture heated with mixing at this temperature for about 5 minutes. The mixture was thereafter molded at 300° F. and allowed to cool in a cold press under about 1500 p.s.i.g. pressure. The specifications and inspection data for this blend are given in Table I.

EXAMPLES II, III, AND IV

These three polyethylene-butyl rubber blends were prepared using the same quantities of the ingredients and the proces of Example I, except that 25 grams of furnace black in Example II, 25 grams of highly calcined kaolin clay in Example II, and 25 grams of precipitated, hydrated silicon dioxide in Example IV were added as fillers simultaneously with the N-methyl-N-nitroso-4-nitrosoaniline and dicumyl peroxide. The compositions and inspection data for these blends are given in Table I.

EXAMPLE V

A polyethylene-butyl rubber blend was prepared by the process of Example I using the ingredients shown in Table I. The furnace black, dicumyl peroxide and p-quinone dioxime were added simultaneously.

EXAMPLES IA, IB, IC, IIA, IIIA, IVA

Several polyethylene-butyl rubber blends were prepared for comparison with the blends of the invention by using the same quantities of the ingredients and the process of Example I, but in the absence of either a catalyst or a bifunctional aromatic compound or in the absence of both. The compositions and inspection data for these comparison blends are given in Table I in columns to the right of the blends of the invention to which they relate.

Table I
PLASTOMER-ELASTOMER BLENDS

|  | Ex. I | Ex. IA | Ex. IB | Ex. IC | Ex. II | Ex. IIA | Ex. III | Ex. IIIA | Ex. IV | Ex. IVA | Ex. V |
|---|---|---|---|---|---|---|---|---|---|---|---|
| Composition: | | | | | | | | | | | |
| Polyethylene, 50,000 molecular wt.—"Hi-Fax" | 100 | 100 | 100 | 100 | 100 | 100 | 100 | 100 | 100 | 100 | 100 |
| Butyl-rubber, 1.5-2 mol percent unsaturation, 97.6 weight percent isobutylene, 2.4 weight percent isoprene | 50 | 50 | 50 | 50 | 50 | 50 | 50 | 50 | 50 | 50 | 50 |
| Furnace black | | | | | 25 | 25 | | | | | 25 |
| Kaolin clay, highly calcined | | | | | | | 25 | 25 | | | |
| Silicon, dioxide, precipitated, hydrated | | | | | | | | | 25 | 25 | |
| P-quinone-dioxime | | | | | | | | | | | 0.75 |
| N-methyl-N-nitroso-4-nitrosoaniline | 0.5 | | 0.5 | | 0.5 | | 0.5 | | 0.5 | | |
| Dicumyl peroxide | 0.5 | | | 0.5 | 0.5 | | 0.5 | | 0.5 | | 0.5 |
| Inspection: | | | | | | | | | | | |
| Tensile strength, p.s.i | 2,110 | 1,650 | 1,560 | 1,470 | 2,105 | 1,850 | 2,260 | 1,360 | 2,100 | 1,630 | 2,225 |
| Hardness, Shore A | 80 | 77 | 72 | 76 | 86 | 83 | 83 | 70 | 81 | 84 | 85 |
| Elongation, percent | 140 | 365 | 850 | 100 | 110 | 100 | 100 | 850 | 100 | 200 | 90 |
| Appearance on flexing, extent of blushing | Slight | Some | Some | Some | | | Some | Marked | Slight | Some | Slight |
| Environmental stress cracking resistance, hours to failure | 800 | 800 | | | | | | | | | |
| Aging, 24 hours at 212° F.: | | | | | | | | | | | |
| Tensile strength, p.s.i | 2,200 | 1,750 | | | | | | | | | |
| Hardness | 83 | 82 | | | | | | | | | |
| Elongation, percent | 100 | 180 | | | | | | | | | |
| Sun lamp, exposure 200 hours | (1) | (2) | | | | | | | | | |
| Fadeometer test, 24 hours | (3) | (4) | | | | | | | | | |

¹ Surface glazed but not waxy.  ² Surface bloom of waxy powder.  ³ Surface glazed.  ⁴ Surface waxy.

As can be seen from the above table, polyethylene-butyl rubber blends prepared with dicumyl peroxide and a bifunctional aromatic compound such as N-methyl-N-nitroso-4-nitrosoaniline or p-quinone dioxime show outstanding characteristics of hardness, tensile strength and resistance to blushing when compared to blends containing only one or neither of these compounds. It is a further advantage of these blends that they have increased resistance to ageing and to actinic radiation. It is to be noted that these advantageous properties are obtained at no decrease in the environmental stress cracking resistance when compared to the polyethylene-butyl rubber blend of Example IA which was prepared in the absence of both a free radical type catalyst and a bifunctional aromatic compound. It can also be seen that the blends of the invention can be extended with fillers such as carbon black, kaolin clay and silicon dioxide without losing their excellent characteristics. The blends of the invention can be used, for example, in the production of harder tougher and more durable burst resistant rigid pipes, and for other such uses where their excellent characteristics are important.

It is to be understood that this invention is not limited to the specific examples which are given by way of illustration only. Modifications in the procedures given for preparing the novel polymer blends can be made without departing from the spirit and scope of the invention.

What is claimed is:

1. A process for preparing a modified blend of polyethylene and butyl rubber comprising reacting 100 parts by weight of polyethylene having a molecular weight in the range of 12,000 to 500,000; 5 to 50 parts by weight of butyl rubber which is a copolymer of about 90 to 99.5% isobutylene and about 10 to 0.5% of a conjugated diolefin; 0.3 to 0.7 part by weight of dicumyl peroxide; 0.5 to 1 part by weight of N-methyl-N-nitroso-4-nitrosoaniline at a temperature in the range of 275 to 290° F. for a time in the range of 8 to 12 minutes to produce said modified blend.

2. The modified polyethylene-butyl rubber blend produced as the product of the process of claim 1.

3. A process as defined in claim 1 wherein the dicumyl peroxide and the N-methyl-N-nitroso-4-nitrosoaniline are added substantially together whereby the coaction of each with the butyl rubber and the polyethylene takes place in the presence of each other.

4. A process as defined in claim 1 wherein said butyl rubber and polyethylene are first blended together and the dicumyl peroxide and the N-methyl-N-nitroso-4-nitrosoaniline are subsequently added substantially together to the butyl rubber-polyethylene blend prior to heating, whereby the coaction of each with the butyl rubber and polyethylene takes place in the presence of each other.

References Cited in the file of this patent

UNITED STATES PATENTS

| | | |
|---|---|---|
| 2,569,541 | Selby | Oct. 2, 1951 |
| 2,609,353 | Rubens et al. | Sept. 2, 1952 |
| 2,628,214 | Pinkney et al. | Feb. 10, 1953 |
| 2,700,185 | Lee | Jan. 25, 1955 |
| 2,830,919 | Schatzel | Apr. 15, 1958 |
| 2,832,748 | Safford et al. | Apr. 29, 1958 |
| 2,838,854 | Dosmann | June 17, 1958 |
| 2,847,715 | Dosmann | Aug. 19, 1958 |
| 2,939,860 | Schramm | June 7, 1960 |
| 3,032,519 | Batts | May 1, 1962 |

OTHER REFERENCES

Whitby: "Synthetic Rubber," John Wiley & Sons, Inc. (1954), p. 850 relied upon.